Dec. 8, 1936.   J. A. McKENZIE   2,063,821
DRILL PIPE FLOAT VALVE
Filed Nov. 30, 1935
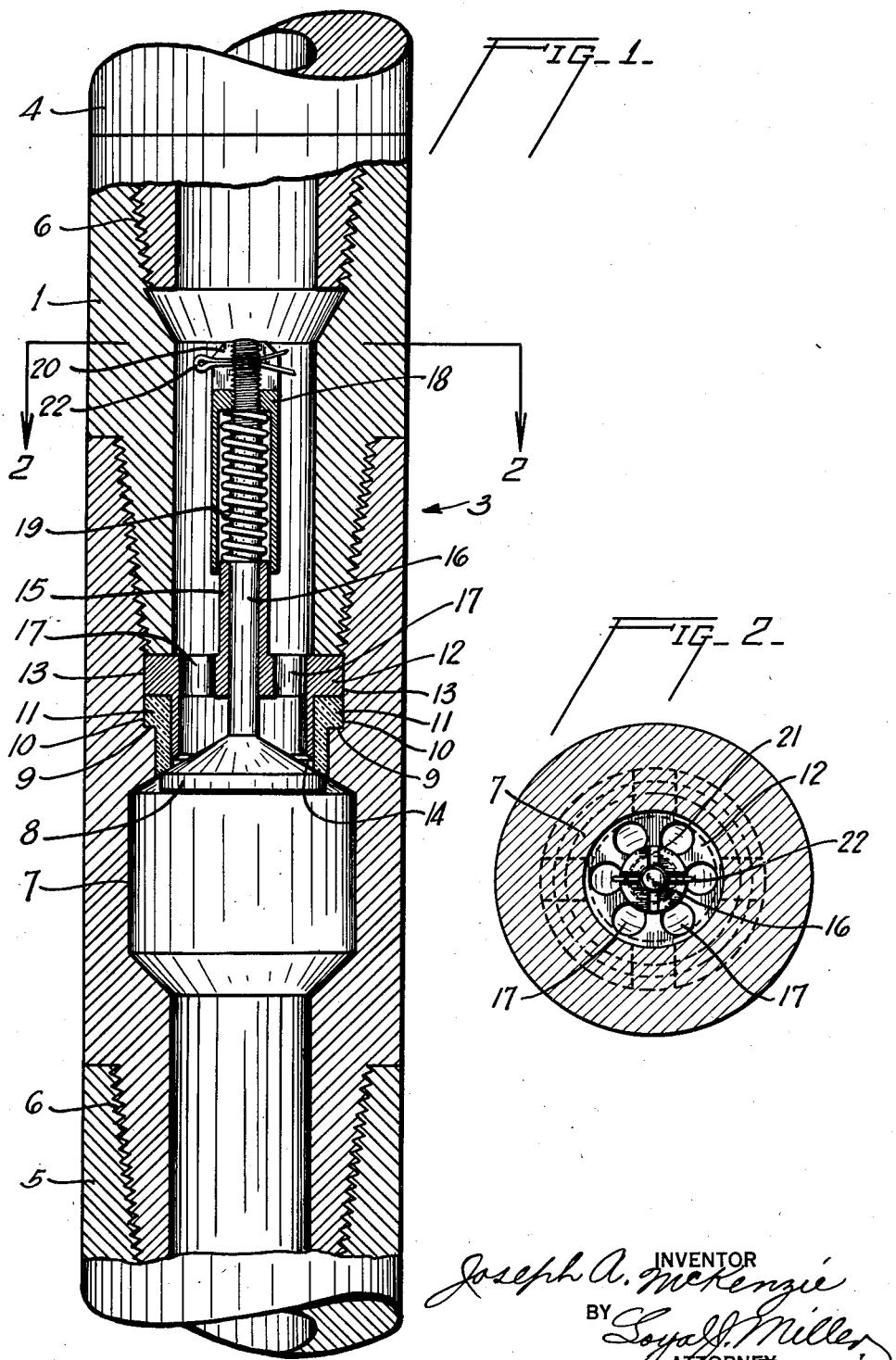
INVENTOR
Joseph A. McKenzie
BY Loyal J. Miller
ATTORNEY Patented Dec. 8, 1936

2,063,821

UNITED STATES PATENT OFFICE 2,063,821

DRILL PIPE FLOAT VALVE

Joseph A. McKenzie, Oklahoma City, Okla.

Application November 30, 1935, Serial No. 52,310

4 Claims. (Cl. 137—69)

My invention relates to high pressure release valves of general applicability, although herein specifically illustrated and described, is for use in connection with a drill pipe float coupling, such as is used in the drilling of deep wells, such as oil wells and the like.

The prime object of the invention is to provide a strong, durable, and efficient valve of the class specified, the seat having a wear resisting resilient contacting surface of rubber or other suitable material for yieldable contact with a valve head and the lower end of the tubular portion of the spider, thus assuring a tight contact between the three with minimum wear.

A further object is to provide a one-piece resilient seat.

A further object is to provide a valve construction in which the seat can be readily replaced when worn, making it unnecessary to renew the entire valve structure, and thus making its use economical and convenient.

Another object is to provide a device of this class which is new, novel, practical and of utility.

Another object is to provide a valve construction in which the valve spring is protected from the well fluid by a housing so as to increase its efficiency and reduce the liability of breakage; and, which will be efficient in accomplishing all the purposes for which it is intended.

With these and other objects in view as will more fully appear hereinbelow, my invention consists in the construction, novel features, and combination of parts hereinafter more fully described, pointed out in the claims hereto appended, and illustrated in the accompanying one-sheet drawing, of which, Figure 1 is a sectional view of the coupling, showing the valve in operating position; and, Figure 2 is a plan sectional view taken along the line 2—2 of Fig. 1, showing the by-pass perforations in the spider with relation to the other parts of the valve mechanism.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

The inventive idea involved is capable of receiving a variety of mechanical expressions one of which, for the purpose of illustrating the invention, is shown in the accompanying drawing wherein:—

Numerals 1 and 2 designate the upper end lower float valve housing members, respectively, the two threadedly connected and together form the float valve housing 3. The complete housing shown as a whole at 3 is adapted to be interposed between any two sections 4 and 5 of a drill pipe, the housing being of the same outside diameter as the drill pipe, and connected to the pipe by means of standard threads as shown at 6. The inside diameter of the housing 3 is substantially the same as the inside diameter of the drill pipe, save at substantially the center of the housing member 2, where it is of greater diameter, and forms a cavity 7, both ends of which are annularly beveled. Above the cavity 7 the inside diameter of the housing 3 reduces to a bore which is only slightly larger in diameter than the valve head 8. This sized bore continues upward a short distance and then increases in diameter forming a flat annular shoulder shown at 9, for receiving and seating an annular flange 10 surrounding the upper end of a cylindrical resilient valve seat 11. This valve seat 11 is of such length that its lower end does not project into the large cavity 7. The lower end of the valve seat 11 is tapered inwardly at the same angle as the seating surface of the valve head 8, so as to insure a tight contact between the two. The seat 11 is held securely in position against the shoulder 9 of the housing by a spider 12, which is in turn held in position by the lower end of member 1 when connected tightly with member 2. The spider 12 has at its upper end an annular flange 13, the outside diameter of which is substantially the same as the diameter of the flange 10 of the valve seat. Below the flange 13 the spider 12 is of a size and shape to contact the entire top surface of the seat 11 and to fit tightly the inside wall of the seat 11. The lower end of the spider does not extend as far as the valve seat 11, but leaves a space 14 which allows for resilient expansion of the seat under pressure from the head 8. The spider has a cylindrical central column 15 extending upward from the top surface of the flange 13. The column is bored to tightly receive and act as a guide for a cylindrical valve stem 16, integral with the head 8. The spider has perforations 17 between the inner edge of the flange and the central column, such perforations acting as by-passes for the well fluid.

A cylindrical spring housing 18 is closed at its upper end with the exception of a threaded perforation, designed to fit the similarly threaded upper end of the valve stem 16. The lower end of the housing 18 is open, and is of such size as to snugly fit around the outside of the central column 15, allowing the housing to slide up and down over the column 15, as the valve opens and closes.

A coiled spring 19 fits loosely around the valve stem 16 and also fits loosely inside the housing. It is approximately the same length as the inside of the housing. In assembled relation to the other parts, the lower end of the spring rests on the upper end of the central column 15. The closed end of the housing 18 contacts the upper end of the spring, slightly compressing the spring. The housing 18 may be screwed in either direction on the valve stem thus adjusting the spring pressure. The housing 18 is locked in any position by an ordinary lock nut 20 with slots 21 in its upper portion to receive the ends of a cotter key 22. A perforation through the upper end of the valve stem is provided for receiving the cotter key.

In assembling the device the seat is placed next the valve head surrounding the stem. The spider 12 is then slipped over the stem and its lower end positioned inside the seat 11. The spring is slipped over the valve stem, and the housing screwed down over the stem properly adjusting the spring tension. The nut is then screwed on the stem, locking the housing in place, and the cotter key is then inserted through the hole in the upper end of the stem and into the slots in the lock nut. The entire unit is then inserted into the member 2 with the valve head downward. By slight downward pressure the resilient valve seat is forced into proper position on the shoulder 9. Member 1 is then screwed into member 2 tightly, its lower end exerting a slight pressure downward on flange 13 and holding the valve seat tightly in place.

In operation, when well fluid is forced downwardly through the drill pipe the valve head 8 is forced, against the compression of spring 19, away from the valve seat 11, the fluid passing downward between the two. When pressure on the fluid is removed, for pulling the casing from the well, the weight of the fluid above the valve in the drill pipe keeps the valve open and allows the liquid to drain out of the drill pipe above the float valve. When the drill pipe is again lowered into the well, the valve head is forced tightly against the valve seat 11 by the liquid in the well in the manner of the usual float valve, allowing the air in the drill pipe to act as a float in assisting to support the pipe, as the pipe sinks into the liquid in the well.

It may be seen that when the head 8 is in its seated position, the lower portion of the valve seat 11 is deformed and not only seals between the valve head and the inner wall of the housing member 2, but also seals between the upper surface of the valve head 8 and the lower end of the tubular portion of the spider 12, or that portion which extends downwardly within the seat 11, thereby constituting a double seal.

From the above description it may readily be seen that all parts of the device may be easily and quickly removable by disconnecting the members 1 and 2 of the valve housing.

Obviously, the invention is susceptible of embodiment in forms other than that which is illustrated in the accompanying drawing and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A drill pipe float valve, in combination with a coupling, comprising a valve head operably mounted in the coupling, a stem connecting the head, a resilient annular valve seat suitably supported in the coupling, an annular spider suitably supporting the inner wall of the seat and acting as a guide for said valve stem, spring means for normally holding said valve head against said valve seat, means for protecting said spring from contact with a well fluid, and means for regulating the pressure exerted by said spring on said valve head.

2. A float valve comprising: a substantially cylindrical housing having an interior annular right angled shoulder formed intermediate its ends; a resilient annular valve seat having an exterior flange at one end for seating on said shoulder, and a sleeve like portion forming a valve seating surface at the other end, the entire outer surface of said seat being in contact with and supported by said shoulder and the adjacent interior wall of said housing; an annular spider having an exterior flange at one end for seating snugly on the flanged end surface of said valve seat, and a sleeve like portion for fitting inside and supporting the major portion of the interior surface of said valve seat; a valve head having a stem; a guide for said stem integral with said spider; a spring on said stem for normally holding the valve head seated on said seat; a spring housing carried by the stem and snugly slidable on said guide; and means for regulating the tension of said spring on the valve head.

3. A valve seat comprising: an annulus of resilient material having its outer surface supported by a shoulder and the adjacent wall of a valve housing; and an annular spider supporting the inner surface and one end of said annulus, and in turn positioned in the housing by snug contact with its walls, and also adapted to guide a valve head to seat on the free end of said annulus; said annulus having a portion of its inner surface, adjacent the seating surface, unsupported, said portion being adapted to allow its expansion under pressure around the edge of a valve head.

4. A valve comprising: an annular resilient seat; an annular spider for positioning the seat in the bore of a housing intermediate its ends; a valve head having an integral stem slidable through and guided by said spider and adapted to normally seat on said resilient seat; and means for automatically closing said valve after it has been forced open by the passage of liquid therethrough, comprising a spring mounted on the valve stem, one of its ends bearing on a central guide sleeve carried by said spider, and its other end bearing on the end of a housing carried by the stem; said housing being held in position on the stem by an adjustable nut, and adapted to completely enclose the spring and to protect it from the action of a fluid passing through the valve.

JOSEPH A. McKENZIE.